United States Patent
Nagasaki

[19]
[11] Patent Number: 5,861,100
[45] Date of Patent: Jan. 19, 1999

[54] METHOD OF WASTE WATER TREATMENT BY FLOCCULATING SEDIMENTATION

[75] Inventor: Yoshimi Nagasaki, Kawasaki, Japan

[73] Assignee: Ajinomoto Co., Inc., Tokyo, Japan

[21] Appl. No.: 911,051

[22] Filed: Aug. 14, 1997

[30] Foreign Application Priority Data

Aug. 26, 1996 [JP] Japan .................................. 8-223370

[51] Int. Cl.$^6$ .................................................. C02F 1/56
[52] U.S. Cl. .......................... 210/725; 210/631; 210/727; 210/730; 210/734
[58] Field of Search .................................. 210/626, 631, 210/725, 726, 727, 730, 733, 734

[56] References Cited

U.S. PATENT DOCUMENTS

| | | | |
|---|---|---|---|
| 3,423,309 | 1/1969 | Albertson | 210/631 |
| 3,673,083 | 6/1972 | Sawyer et al. | 210/631 |
| 3,728,253 | 4/1973 | Kaufman | 210/624 |
| 3,835,045 | 9/1974 | Hussissian | 210/709 |
| 3,846,293 | 11/1974 | Campbell | 210/727 |
| 4,388,195 | 6/1983 | von Hagel et al. | 210/709 |
| 5,160,621 | 11/1992 | Nagasaki et al. | 210/614 |
| 5,433,853 | 7/1995 | Mamone | 210/615 |
| 5,573,670 | 11/1996 | Nagasaki et al. | 210/614 |

*Primary Examiner*—Peter A. Hruskoci
*Attorney, Agent, or Firm*—Oblon, Spivak, McClelland, Maier & Neustadt, P.C.

[57] ABSTRACT

The method of the invention is characterized by adding comprises adding an inorganic flocculant to waste water treated with activated sludge process, adjusting the waste water between pH 4.0 and 5.0, waste water in this state for at least 1 minute, adjusting the waste water between pH 5.5 and 9.0 and adding an anionic polymer flocculant to generate flocs and separating the flocs to obtain supernatant. According to the invention, flocs become large, especially since flocs grow by adsorbing fine particles during maturation. The clarity of the treated water is sharply improved, and the qualities of the treated water, such as COD and chromaticity are also improved. Moreover, the scale of sedimentation tank can be made compact due to the improvement in precipitatability of flocs by growing into large size.

10 Claims, 1 Drawing Sheet

METHOD OF WASTE WATER TREATMENT BY FLOCCULATING SEDIMENTATION

BACKGROUND OF THE INVENTION

This invention relates to an improvement in a waste water treatment through an activated sludge process for purifying waste water, such as industrial waste water or living waste water by decomposing organic materials therein by using aerobic bacteria.

It is widely carried out to purify waste water containing organic materials through an activated sludge process. In the activated sludge process, organic materials in waste water are digested by microorganisms in an aeration tank, and then, the waste water is transferred to a sedimentation tank. Flocculated microorganisms, etc. are precipitated and separated there. The supernatant is, if necessary, further purified, and then discharged into river, etc. or utilized again.

Occasionally, centrifugation is substituted for the sedimentation tank.

A method of the purification is disclosed in Japanese Patent KOKAI 53-122249 which comprises adding a flocculant to the supernatant to flocculate residual microorganisms, etc., discharging carbon dioxide gas in the supernatant under conditions of pH 4.5 or lower, and then, adjusting the pH of the supernatant to neutral region where the librated ammonia concentration is 1.5 ppm or less.

Another method of the purification is disclosed in Japanese Patent KOKOKU 64-4837 which comprises of adding an inorganic flocculant and an organic polymer flocculant to the supernatant to form sludge flocs, and then, separating the precipitates of the sludge flocs to obtain purified waste water.

The inventors reported a waste water treatment in a glutamic acid manufacturing factory comprising of treating the waste water with an activated sludge process, adding a flocculant to the supernatant to flocculate residual organic materials, pigments, etc., separating the precipitated flocculates, and then, treating the supernatant with activated carbon (KOGAI TO TAISAKU, vol. 27, No. 8, pp 759–763, 1991). In the report, relations between the type of flocculant and pH, decoloration degree or precipitatability of flocculates were also reported.

Incidentally, the point of waste water treatment is in how to remove contaminates surely and efficiently by inexpensive means.

The method disclosed in Japanese Patent KOKAI 53-122249 purifies waste water sophisticatedly in view of resolving problems of discharged water treated with activated sludge process in living of fishes. This method utilizes a combination of an inorganic flocculant and a polymer flocculant, but does not disclose to add them in two steps with varying pH, etc.

The method disclosed in Japanese Patent KOKOKU 64-4837 improves the high load treatment of activated sludge and precipitation concentration of flocculated sludges from the supernatant. By increasing the concentration of suspended matters, the high load treatment is achieved, and by flocculating using an inorganic flocculant and an organic polymer flocculant, flocculation of flocs is improved. In this method, the inorganic flocculant and the organic polymer flocculant are successively added. However, pH is adjusted to 5, and this method does not disclose to treat in two steps with varying pH.

SUMMARY OF THE INVENTION

An object of the invention is to provide a method of waste water treatment capable of remarkably improving the flocculating ability of suspensoids by simple and inexpensive means and capable of removing suspensoids surely and efficiently, in a process of flocculating to separate suspensoids from the supernatant obtained by separating activated sludges.

The inventors investigated eagerly in order to achieve the above object, and found that flocs excellent in flocculation and sedimentation can be obtained by conducting flocculation using an inorganic flocculant and an anionic polymer flocculant in two steps with varying pH, and providing a maturing period after the treatment with the inorganic flocculant in the first step.

Thus, the present invention provides a method of waste water treatment which comprises of adding an inorganic flocculant to waste water treated with activated sludge process, adjusting the waste water between pH 4.0 and 5.0, keeping the waste water in this state for at least 1 minute, adjusting the waste water between pH 5.5 and 9.0 and adding an anionic polymer flocculant to generate flocs and separating the flocs to obtain supernatant.

DETAILED DESCRIPTION OF THE INVENTION

Figure 1:
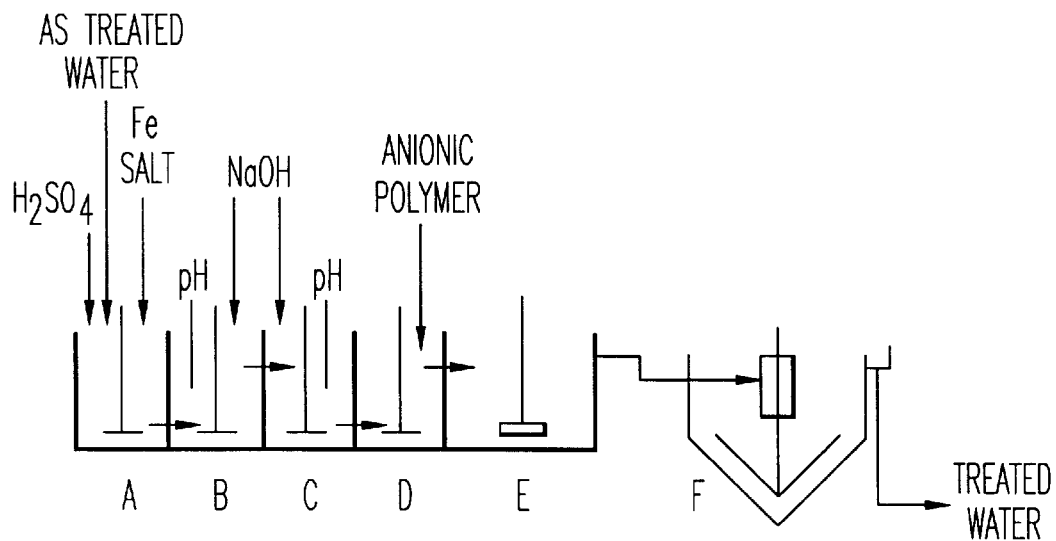
FIG. 1 illustrates the construction of the apparatus used in the inventive method in Example 4.

The waste waters to be treated by the method of the invention may be any type of waste waters containing organic materials which can be treated by activated sludge process, such as various industrial waste waters and living waste waters, and so on. The method of the invention is particularly suitable for waste waters discharged from factories of various amino acid fermentations, such as glutamic acid. Waste water treated with activated sludge process is the waste water wherein organic materials have been digested by bacteria living in the activated sludge and then the activated sludge has been separated.

Although various activated sludge processes are known, the method of the invention is applicable thereto, irrespective of their types. The separation process of sludges may be either sedimentation or cenrifugation.

The suspensoids concentration of the waste water after its treatment by activated sludge process is about 10 to 200 mg/l, usually about 50 to 100 mg/l. The main components of the suspensoids are activated sludge which leaked from the separation process, and others include suspensoids derived from the original waste water.

The inorganic flocculants can be divided into those based by aluminum salts and those based by iron salts. Exemplary aluminum salt based flocculants include aluminum sulfate, sodium aluminate, magnesium aluminate, basic aluminum chloride (poly aluminum chloride) and the like, and exemplary iron salt based flocculants include ferrous sulfate, ferric sulfate, polyiron sulfate, ferric chloride and the like. In addition, alum, calcium hydroxide, fly ash, and the like are also usable. In the invention, the inorganic flocculant can be used as individual or mixture of two or more. Preferable inorganic flocculants are iron salt based ones, especially ferric chloride, in view of excellent sedimentation of flocs.

A suitable concentration of the inorganic flocculant varies according to the type thereof and so on, and in general, is about 10 to 500 ppm of the waste water. In the case of ferric chloride, a suitable amount is about 100 to 300 ppm.

After the inorganic flocculant is added, the pH of the waste water is adjusted to 4.0 to 5.0, preferably 4.3 to 4.7. Acid or alkali used for the pH adjustment may be conventional ones, such as sulfuric acid, hydrochloric acid, sodium hydroxide and calcium hydroxide. The pH adjustment is, in brief, conducted so that the pH of the waste water becomes in the above range, after the inorganic flocculant is added.

For example, when about 40% ferric chloride solution is added to the waste water after treated with activated sludge process in a concentration of 100 to 300 ppm, the pH of the waste water becomes 2.5 to 3.5. Then, the waste water is adjusted between pH 4.0 and 5.0 by adding sodium hydroxide.

After adding the inorganic flocculant and adjusting the pH between 4.0 and 5.0, the waste water is matured by keeping that condition for 1 minute or more, preferably 2 minutes or more. The maturation is conducted for the purpose of allowing flocs of suspensoids to grow. The upper limit of maturation period is set in view of increasing the rate of maturing effect and effective utilization of the apparatus, and in general is 1 hour or less, preferably 10 minutes or less. In the case the maturation is batchwise operation, the waste water in the tank is left or slowly stirred so that flocs are not broken. In the case of continuous operation, a maturing tank or a large size pipe is provided, and the waste water is passed therethrough for a prescribed period.

After maturation, the pH of the waste water is adjusted between 5.5 and 9.0 by adding alkali. In view of decolorization of waste water a preferable upper limit of pH is 7 or less, particularly preferably 6.5 or less. The alkali may be conventional, such as sodium hydroxide or calcium hydroxide.

Either the pH adjustment or the addition of the anionic polymer flocculant precedes.

The anionic polymer flocculants include sodium alginate, sodium carboxymethyl cellulose, sodium polyacrylate, partial hydrolyzate of polyacrylamide, maleic acid copolymers and the like. Preferred one is partial hydrolyzate of polyacrylamide. Two or more anionic polymer flocculants can be used. A suitable concentration of the anionic polymer flocculant varies according to the type thereof and so on, and in general, is about 0.5 to 5 ppm, especially about 1 to 3 ppm. In the case of partial hydrolyzate of polyacrylamide, a preferable concentration is about 1 to 2 ppm. The anionic polymer flocculant is, in general, added in a form of aqueous solution, and a suitable concentration is about 0.5 to 3 g/l. In the case of partial hydrolyzate of polyacrylamide, about 1 to 2 g/l aqueous solution is suitable.

Throughout the method of the invention, the temperature of the waste water is fundamentally not necessary to be controlled.

After adding the anionic polymer flocculant, flocs which formed are separated. The separation may be carried out by either sedimentation or centrifugation, but sedimentation is preferable because of its simple operation and inexpensive cost. COD and pigments remaining in the waste water are also removed together with the flocs.

The waste water from which the flocs have been removed is optionally further purified according to its properties and its use, and then supplied for use or discharged into river or the like. The flocs separated is treated together with excess sludge, unless it has a special use.

According to the invention, flocs grow large, especially, when flocs grow by adsorbing fine particles during maturation. The clarity of the treated water is sharply improved, and the qualities of the treated water, such as COD and chromaticity, are also improved. Moreover, the scale of sedimentation tank can be made compact due to the improvement in precipitatability of flocs by growing into large size.

EXAMPLES

Example 1

One liter of waste water treated with activated sludge process of pH 6.5 was put in a beaker (effective internal volume: 1l) having a size of 11 cm in diameter and 15 cm in height, and placed on a jar tester (MJS-4 type).

A stirring rod provided with 2 stirring blades 10 mm in width and 5 cm in length was inserted therein, and the waste water was stirred at a rotational speed of 150 rpm. A pH meter was inserted, and the pH of the waste water was adjusted to 6.0 by adding sulfuric acid. 2 ml of 100 mg/l ferric chloride solution was added, and stirred rapidly for about 1 minute. The pH of the waste water, which had been lowered to about 3.4 by the addition of ferric chloride, was adjusted to 4.5 by adding sodium hydroxide, and matured for 2 minutes. Then, the pH of the waste water was adjusted to 6.0 by adding sodium hydroxide, and 2 ml of 1 mg/ml anionic polymer flocculant (partial hydrolyzate of polyacrylamide "Evergrows A-151" Ebara Corporation) was added.

After stirring rapidly for about 1 minute, rotational speed was lowered to 50 rpm, and slow stirring was continued for about 2 minutes while flocs grew. The stirring rod was taken out, and the flocs were precipitated by leaving the waste water for 5 minutes, and the supernatant was separated. The COD and chromaticity of the supernatant were measured.

For comparison, the same volume of waste water treated with activated sludge process having the same quality was put in the same form beaker, and placed on the same jar tester. Similarly, the waste water was adjusted to pH 6.0 by adding sulfuric acid, and the same amount of ferric chloride solution having the same concentration was added. The waste water was stirred rapidly for about 1 minute. The pH of the waste water, which had been lowered to about 3. 2, was adjusted to 6.0 by adding sodium hydroxide, and the same amount of the same anionic polymer blocculant having the same concentration was added. After stirring rapidly for about 1 minute, rotational speed was lowered to 50 rpm, and slow stirring was continued for about 2 minutes while the flocs grew. The stirring rod was taken out, and the flocs were precipitated by leaving the waste water for 5 minutes, and the supernatant was separated. The COD and chromaticity of the supernatant were measured.

The results are shown in Table 1.

TABLE 1

|  | Invention | Comparative |
| --- | --- | --- |
| Size of Flocs | LLL | L |
| Precipitatability of Flocs | Very Good | Good |
| Clarity of Supernatant | Very Good | Good |
| COD before Treatment *[1] (mg/l) | 388 | 388 |
| COD after Treatment (mg/l) | 201 | 225 |
| Removal Rate (%) | 48 | 42 |
| Chromaticity before Treatment *[1] (- Log T400) | 0.78 | 0.78 |
| Chromaticity after Treatment (- Log T400) | 0.29 | 0.41 |
| Removal Rate (%) | 63 | 47 |

*[1] Waste water treated with activated sludge process

Example 2

Except that the pH of the waste water, which had been lowered to about 3.4 by the addition of ferric chloride, was adjusted to 4.0, the same experiment as Example 1 was carried out.

The results are shown in Table 2.

TABLE 2

|  | Invention | Comparative |
|---|---|---|
| Size of Flocs | LLL | L |
| Precipitatability of Flocs | Very Good | Good |
| Clarity of Supernatant | Very Good | Good |
| COD before Treatment *[1] (mg/l) | 388 | 388 |
| COD after Treatment (mg/l) | 217 | 225 |
| Removal Rate (%) | 44 | 42 |
| Chromaticity before Treatment *[1] (- Log T400) | 0.78 | 0.78 |
| Chromaticity after Treatment (- Log T400) | 0.28 | 0.41 |
| Removal Rate (%) | 64 | 47 |

*[1] Waste water treated with activated sludge process

Example 3

Except that the pH of the waste water, which had been lowered to about 3.4 by the addition of ferric chloride, was adjusted to 5.0, the same experiment as Example 1 was carried out.

The results are shown in Table 3.

TABLE 3

|  | Invention | Comparative |
|---|---|---|
| Size of Flocs | LLL | L |
| Precipitatability of Flocs | Very Good | Good |
| Clarity of Supernatant | Very Good | Good |
| COD before Treatment *[1] (mg/l) | 388 | 388 |
| COD after Treatment (mg/l) | 205 | 225 |
| Removal Rate (%) | 47 | 42 |
| Chromaticity before Treatment *[1] (- Log T400) | 0.78 | 0.78 |
| Chromaticity after Treatment (- Log T400) | 0.29 | 0.41 |
| Removal Rate (%) | 63 | 47 |

*[1] Waste water treated with activated sludge process

Example 4

Figure 2:
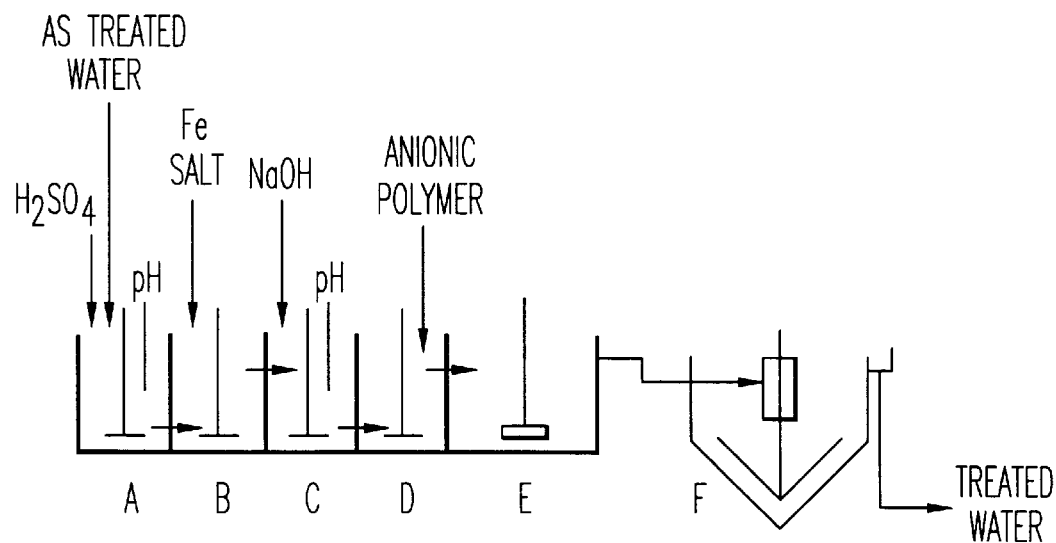
FIG. 2 illustrates the construction of the apparatus used in the comparative method in Example 4.

As shown in FIGS. 1 and 2, the flocculation tank consisted of 4 chambers A–D each having a size of 1.5 m in length, 1.5 m in width, 1.7 m in height and an internal volume of 3.8 $m^3$ and 1 chamber E having a size of 2 m in length, 3 m in width, 1.5 m in height and an internal volume of 9 $m^3$ which were connected in series. Waste water treated with activated sludge process was introduced into chamber A, flowed into chamber B from the bottom of chamber A, into chamber C from the top of chamber B by overflowing, into chamber D from the bottom of chamber C, and into chamber B from the top of chamber D, successively. The waste water overflowed from chamber E entered sedimentation tank F having a size of 9 m in diameter and an internal volume of 190 $m^3$ through a chute. Flocs were precipitated there, and supernatant overflowed from tank F as treated water. A rapid stirrer was installed in each chamber A–D, and a slow stirrer was installed in chamber E.

Moreover, a pH meter was installed in each chamber A or B and C.

In a comparative method, the apparatus shown in FIG. 2 was used, and waste water with about pH 6.5 treated with activated sludge process was introduced into chamber A at a rate of 2,000 $m^3$/day. The pH of the waste water was adjusted there to 6.0 by adding sulfuric acid. At chamber B, 40% ferric chloride solution was added in a concentration of 300 ppm, and at chamber C, the pH lowered to 3.2 was adjusted to 6.0 by adding sodium hydroxide. At chamber D, anionic polymer flocculant (partial hydrolyzate of polyacrylamide "Evergrows A-151", Ebara Seisakusho) was added in a concentration of 3 ppm to generate flocs, and at chamber E, the flocs were matured to grow. At sedimentation tank F, the flocs were separated by sedimentation, and the supernatant was discharged as treated water.

In a inventive method, the apparatus shown in FIG. 1 was used. The waste water having the same quality was introduced into chamber A at the same rate, and the same ferric chloride solution was added there to the waste water in a concentration of 200 ppm. At chamber B, the pH of the waste water lowered to 3.5 was adjusted to 4.5 by measuring using the pH meter transferred from chamber A. At chamber C, the pH of the waste water was adjusted to 6.0 by adding sodium hydroxide, and at chamber D anionic polymer flocculant (partial hydrolyzate of polyacrylamide "Evergrows A-151", Ebara Corporation) was added in a concentration of 2 ppm to generate flocs, and at chamber E, the flocs were matured to grow. At sedimentation tank F, the flocs were separated by sedimentation, and the supernatant was discharged as treated water.

The results are shown in Table 4.

TABLE 4

|  | Invention | Comparative |
|---|---|---|
| COD before Treatment *[1] (mg/l) | 392 | 392 |
| COD after Treatment (mg/l) | 182 | 218 |
| Removal Rate (%) | 54 | 44 |
| Chromaticity before Treatment *[1] (- Los T400) | 0.72 | 0.72 |
| Chromaticity after Treatment (- Los T400) | 0.31 | 0.38 |
| Removal Rate (%) | 57 | 47 |
| SS before Treatment *[1] (mg/l) | 100 | 100 |
| SS after Treatment (mg/1) | 10 | 20 |

*[1] Waste water treated with activated sludge process

I claim:

1. A method of waste water treatment to remove COD and chromaticity which comprises adding an inorganic flocculant to a waste water containing COD and chromaticity treated with activated sludge process, adjusting the waste water between pH 4.0 and 5.0, keeping the waste water in this state at least for 1 minute, adjusting the waste water between pH 5.5 and 9.0, and adding an anionic polymer flocculant to generate flocs, and separating the flocs to obtain supernatant and remove COD and chromaticity from said waste water.

2. The method of claim 1 wherein the waste water to which an inorganic flocculant is added contains 10 to 200 mg/l suspensoids.

3. The method of claim 1 wherein the inorganic flocculant is an aluminum salt based flocculant or an iron salt based flocculant.

4. The method of claim 1 wherein the inorganic flocculant is ferric chloride.

5. The method of claim 4 wherein ferric chloride is added in a concentration of 100 to 300 ppm.

6. The method of claim 1 wherein keeping period is 2 to 10 minutes.

7. The method of claim 1 wherein the pH of the waste water to which the anionic polymer flocculant is added is 5.5 to 7.0.

8. The method of claim 1 wherein the anionic polymer flocculant is a member selected from the group consisting of sodium alginate, sodium carboxymethyl cellulose, sodium polyacrylate, partial hydrolyzate of polyacrylamide and maleic acid copolymers.

9. The method of claim 1 wherein the anionic polymer flocculant is partial hydrolyzate of polyacrylamide.

10. The method of claim 1 wherein the anionic polymer flocculant is added in a concentration of 0.5 to 3 g/l.

* * * * *